United States Patent
Bezdek et al.

(10) Patent No.: US 9,970,796 B2
(45) Date of Patent: May 15, 2018

(54) METHOD FOR MONITORING THE OPERATING STATE OF AN ULTRASONIC TRANSDUCER IN AN ULTRASONIC, FLOW MEASURING DEVICE

(71) Applicant: Endress + Hauser Flowtec AG, Reinach (CH)

(72) Inventors: Michal Bezdek, Aesch (CH); Pierre Ueberschlag, Saint-Louis (FR)

(73) Assignee: Endress + Hauser Flowtec AG, Reinach (CH)

( * ) Notice: Subject to any disclaimer, the term of this patent is extended or adjusted under 35 U.S.C. 154(b) by 853 days.

(21) Appl. No.: 14/399,068

(22) PCT Filed: Apr. 25, 2013

(86) PCT No.: PCT/EP2013/058578
§ 371 (c)(1),
(2) Date: Nov. 5, 2014

(87) PCT Pub. No.: WO2013/167385
PCT Pub. Date: Nov. 14, 2013

(65) Prior Publication Data
US 2015/0107370 A1    Apr. 23, 2015

(30) Foreign Application Priority Data
May 9, 2012 (DE) .......................... 10 2012 104 042

(51) Int. Cl.
*G01F 1/66* (2006.01)
*G01F 25/00* (2006.01)

(52) U.S. Cl.
CPC ............... *G01F 1/66* (2013.01); *G01F 1/667* (2013.01); *G01F 1/668* (2013.01); *G01F 25/0007* (2013.01)

(58) Field of Classification Search
CPC ..... G06F 1/66; G01F 23/2968; G01F 25/0007
See application file for complete search history.

(56) References Cited

U.S. PATENT DOCUMENTS 4,882,931 A    11/1989  Breeuwer
5,175,530 A    12/1992  Eng
(Continued)

FOREIGN PATENT DOCUMENTS

DE    2641772 A1    3/1978
DE    19625667 A1   1/1998
(Continued)

OTHER PUBLICATIONS

German Search Report, German PTO, Munich, dated Jan. 10, 2013.
(Continued)

*Primary Examiner* — Brian W Wathen
(74) *Attorney, Agent, or Firm* — Bacon & Thomas, PLLC

(57) ABSTRACT

A method for monitoring the operating state of a first ultrasonic transducer in an ultrasonic, flow measuring device having at least one measuring tube and at least two ultrasonic transducers, including steps as follows: a) providing a first value or a plurality of first values, which relate to the geometric arrangement of the first ultrasonic transducer in the measuring tube and/or to the geometric arrangement of the first ultrasonic transducer relative to a second ultrasonic transducer; b) ascertaining a second value or a plurality of second values for a flow velocity of a medium located in the measuring tube c) providing a third value and/or a plurality of third values for temperature and/or pressure of the medium located in the measuring tube; d) simulating a desired value of a signal strength taking into consideration the first, second and/or third values; and e) comparing the simulated desired value of a signal strength with an ascertained real value of the signal strength.

9 Claims, 1 Drawing Sheet

(56) References Cited

U.S. PATENT DOCUMENTS

| | | |
|---|---|---|
| 7,236,912 B2 | 6/2007 | Froehlich |
| 2004/0149285 A1 | 8/2004 | Wallen |
| 2004/0230116 A1* | 11/2004 | Cowan ............... A61B 17/2202 |
| | | 600/437 |
| 2005/0011278 A1 | 1/2005 | Brown |
| 2008/0255781 A1* | 10/2008 | Beard .................. G01N 29/041 |
| | | 702/59 |
| 2009/0240453 A1 | 9/2009 | Straub, Jr. |
| 2011/0277558 A1* | 11/2011 | Dietz ...................... G01F 1/662 |
| | | 73/861.31 |
| 2013/0047695 A1 | 2/2013 | Drachmann |

FOREIGN PATENT DOCUMENTS

| | | |
|---|---|---|
| DE | 10254053 A1 | 6/2004 |
| DE | 2009410 A1 | 12/2008 |
| DE | 102010035859 A1 | 3/2011 |
| EP | 0218293 A1 | 4/1987 |
| EP | 1441222 A2 | 7/2004 |
| JP | 2005037290 A | 2/2005 |
| WO | 2011134470 A2 | 11/2011 |

OTHER PUBLICATIONS

English Translation of the International Preliminary Report on Patentability, WIPO, Geneva, CH, dated Nov. 20, 2014.
International Search Report, EPO, The Netherlands, dated Oct. 10, 2013.

\* cited by examiner

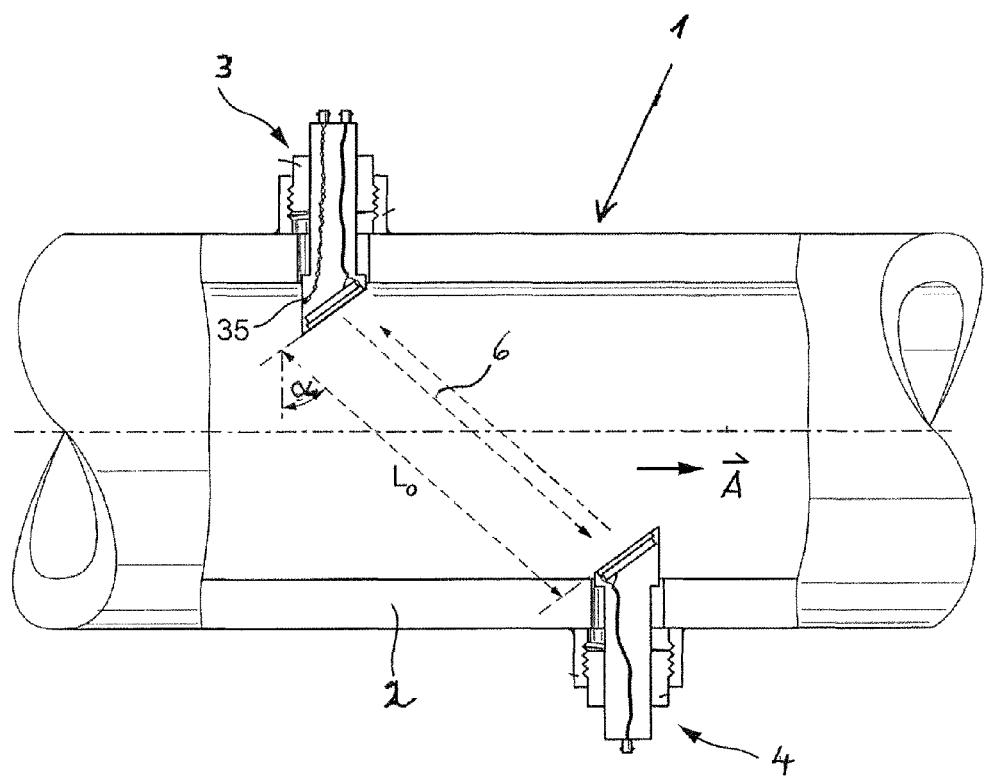

METHOD FOR MONITORING THE OPERATING STATE OF AN ULTRASONIC TRANSDUCER IN AN ULTRASONIC, FLOW MEASURING DEVICE

TECHNICAL FIELD

The invention relates to a method for monitoring the operating state of an ultrasonic transducer in an ultrasonic, flow measuring device.

BACKGROUND DISCUSSION

Ultrasonic, flow measuring devices yield, besides data regarding the flow velocity of a medium and the velocity of sound of ultrasonic signals in the medium, also information concerning signal strengths and the signal-to-noise ratio. The evaluation of these variables and their tolerances is, however, left to the expert. Therefore, the usual plant technician responsible for servicing the plant and the device can only with difficulty estimate whether a failure of the measuring device is imminent. Known are ultrasonic, flow measuring devices, which display a critical state of the measuring system, for example, a signal strength that is too low. This occurs, however, only when there is no longer any signal at all and measurement has already stopped.

SUMMARY OF THE INVENTION

Based on the above, it is an object of the present invention to provide a method for monitoring the operating state of an ultrasonic transducer in a measuring device.

The invention achieves this goal by a method for monitoring the operating state of a first ultrasonic transducer in an ultrasonic, flow measuring device having at least one measuring tube and at least two ultrasonic transducers, comprises steps as follows:
a) providing a first value or a plurality of first values, which relate to the geometric arrangement of the first ultrasonic transducer in the measuring tube and/or to the geometric arrangement of the first ultrasonic transducer relative to a second ultrasonic transducer,
b) ascertaining a second value or a plurality of second values for a flow velocity of a medium located in the measuring tube;
c) providing a third value and/or a plurality of third values for temperature and/or pressure of the medium located in the measuring tube;
d) simulating a desired value of a signal strength or of a signal-to-noise ratio taking into consideration the first, second, and/or third values; and
e) comparing the simulated desired value of the signal strength or of the signal-to-noise ratio with an ascertained real value of the signal strength or of the signal-to-noise ratio.

By comparing the simulated desired value of the signal strength or of the signal-to-noise ratio with the ascertained real value, the plant technician can directly provide an evaluation regarding the operating state and whether failure of the ultrasonic transducer is threatened.

The simulating of a desired value of a signal strength or of the signal-to-noise ratio can occur based on at least two different values of the first, second and/or third values. Thus, e.g. in the case of liquids, the signal strength can depend essentially on the dimensions of the measuring tube and on the attenuation of the ultrasonic signal in the medium. The dimensions of the measuring tube can be taken into consideration by using the path length in calculating the simulated value. The attenuation of the ultrasonic signal in the medium can be taken into consideration by ascertaining the temperature and using such in calculating the simulated value.

Especially in the case of simulating the desired value of a signal strength in the case of gases, preferably supplementary to the path length, as first value, the sensor angle of the first ultrasonic transducer in the measuring tube is advantageously also provided. The providing of this first value for a sensor angle, especially in connection with the velocity of sound, enables in the case of simulating the desired value the taking into consideration of the deflection, respectively dispersion, of the ultrasonic signal in the case of higher flow velocities in the flow direction and thus the taking into consideration of the therewith connected lessening of the signal strength.

Especially in the case of gases, moreover, by ascertaining the pressure, the signal amplification at increasing pressure can advantageously be taken into consideration for ascertaining the desired value.

The simulating of the desired value of the signal strength taking into consideration the first, second and/or third values can preferably occur by calculating a process term, which describes, based on the first, second and/or third values, the influences of the properties of the medium and/or the geometry of the measuring tube and/or the orientation of the ultrasonic transducer on the signal strength of an ultrasonic signal.

BRIEF DESCRIPTION OF THE DRAWINGS

The invention will now be described in greater detail based on the example of an embodiment set forth in the appended drawing, the sole FIGURE of which shows as follows:

FIG. 1 is a schematic representation of an ultrasonic, flow measuring device.

DETAILED DISCUSSION IN CONJUNCTION WITH THE DRAWING

FIG. 1 shows a per se known, ultrasonic, flow measuring device 1, which includes a measuring tube 2 and two ultrasonic transducers 3 and 4. The first ultrasonic transducer 3 transmits at a point in time t an inclined, first ultrasonic signal in the flow direction A, and this signal is then detected by the second ultrasonic transducer 4. The traveled path is referred to as the signal path 6 and has a path length $L_0$. Then, the second ultrasonic transducer 4 transmits an inclined, second ultrasonic signal, counter to the flow direction A, and this is detected by the first ultrasonic transducer 3. The first ultrasonic signal transmitted inclined in flow direction A requires a time $t_{down}$ for traveling the signal path 6. The second ultrasonic signal transmitted inclined counter to the flow direction A requires a time $t_{up}$ for traveling the signal path 6, wherein $t_{down}$ is less than $t_{up}$.

From the time difference $t_{up} - t_{down}$, the flow velocity v can be ascertained based on the following formula:

$$v = K \frac{L_0}{2\sin\alpha} \cdot \frac{t_{up} - t_{down}}{t_{up} \cdot t_{down}},$$

wherein $L_0$ is the path length of the signal path 6 in the medium in millimeter, $\alpha$ is the sensor angle, measured from the normal of the measuring tube, in ° and K is a function describing the flow profile.

The velocity of sound c in the medium flowing in the measuring tube 2 can be ascertained according to the formula $$c = \frac{L_0}{2}\left[\frac{1}{t_{up}} + \frac{1}{t_{down}}\right]$$

or, in the case of gases, according to the formula $$c = \sqrt{\frac{\gamma RT}{M}} \text{ (ideal gas equation)},$$

wherein γ is the specific heat capacity of the medium flowing in the measuring tube 2, R is the universal gas constant (R=8.3143 J/mol K), T the absolute temperature in Kelvin and M the molecular weight of the medium in kilogram. In the case of gas mixtures, the specific heat capacity is composed of separate terms for the specific heat capacities of the components. Also, the molecular weight of the gas mixture is composed of separate terms for the molecular weights of the components. The methodology for calculating these values of the gas mixture is explained in greater detail in DE 10 2006 030 964.2 of the applicant.

The velocity of sound c and the flow velocity v can, thus, be measured directly by the ultrasonic, flow measuring device 1 using the travel-time difference method in the case of known path length $L_0$, sensor angle α and flow profile.

The positioning of the ultrasonic transducers 3 and 4 in the measuring tube 2 is not limited to the arrangement shown in FIG. 1, but, instead, basically all other arrangements of ultrasonic transducers for measuring the travel-time difference can be applied, thus, for instance, an arrangement in the case of which the ultrasonic transducers are located on oppositely lying sides of the measuring tube, such as is shown, for example, in DE 10 2006 030 954.2.

With increasing duration of operation of the ultrasonic, flow measuring device, aging phenomena, fouling or creep can affect the ultrasonic transducers. Therefore, it is extremely useful to monitor the state of the ultrasonic, flow measuring device 1, respectively the ultrasonic transducers 3 and 4. This monitoring is accomplished by the method of the invention for diagnosis of the operating state of an ultrasonic transducer.

The method of the invention works using comparison of a measured signal strength $SS_{meas}$ at the point in time $t_1$ with a reference value, respectively desired value, of a simulated signal strength $SS_{simulation}$ preferably likewise ascertained for the point in time $t_1$.

The method serves firstly for monitoring the operating state of the first ultrasonic transducer 3 in the ultrasonic, flow measuring device 1 having at least the measuring tube 2 and at least the two ultrasonic transducers 3 and 4. It can, however, also advantageously be expanded to predict the probability of failure of the ultrasonic transducer 3.

In such case, the method includes steps as follows:

In a first step a) a first value or a plurality of first values is/are provided, which relate to the geometric arrangement of the first ultrasonic transducer 3 in the measuring tube 2 and/or to the geometric arrangement of the first ultrasonic transducer 3 relative to the second ultrasonic transducer 4.

The terminology "provided" in the sense of the present invention means either the statement of already known data or an ascertaining of a value in the method or, in an earlier method, the ascertaining of a corresponding value, which is then forwarded, for example, via an interface, to the ultrasonic, flow measuring device 1.

In a second step b), a second value or a plurality of second values is/are ascertained for a flow velocity of a medium located in the measuring tube 2. This value is basically always ascertained in the case of an ultrasonic, flow measuring device. In the present case, it is, however, also utilized for the simulation of the signal strength $SS_{simulation}$.

Optionally, an additional step can occur for ascertaining a fourth value or a plurality of fourth values for the velocity of sound in a medium located in the measuring tube 2. This value is basically always supplementary ascertained in the case of ascertaining the flow velocity in an ultrasonic, flow measuring device. In the present case, it is, however, also utilized, especially in the case of gas applications, for the simulation of the signal strength $SS_{simulation}$.

In a third step c), a fourth value and/or a plurality of fourth values is/are provided for the temperature T and/or the pressure p of the medium located in the measuring tube 2. The temperature T and the pressure p can be determined preferably by corresponding sensors arranged in the ultrasonic, flow measuring device 1, whereby larger deviations of the values of the medium by longer measuring paths are prevented. Alternatively, also manual input can occur in the case of known temperature and/or pressure of the medium or there can be an earlier determining of these values.

The method is not limited to any particular sequence of steps for the first three steps a)-c), as well as the optional ascertaining of the velocity of sound. Thus, for example, also the providing of the fourth value for the temperature and/or pressure can occur before the ascertaining of the flow velocity.

After the providing or ascertaining the aforementioned values, in a step d), a simulating of a desired value of a signal strength can occur taking into consideration the first, second, third and/or fourth values.

This simulation will now be explained in greater detail:

The desired value of the simulated signal strength $SS_{simulation}$ is composed preferably of a starting value SV and a value for the process attenuation PA. The starting value is a predetermined value, which can be experimentally ascertained by preliminary experiments and preset in the plant. The process attenuation PA is subtracted from this starting value SV. Entering into the process attenuation PA are different factors based on measuring conditions, for instance the geometric arrangement of the ultrasonic transducer 3 and the properties of the medium to be measured. In the real case, these factors act weakeningly or reinforcingly on the signal strength of the ultrasonic signal.

The basic formula for calculating the desired value of the simulated signal strength $SS_{simulation}$ is thus:

$SS_{simulation}$=SV(starting value)−PA(process attenuation)

The process attenuation PA preferably includes, especially in the case of biogas measurements, diffraction, subsequently referred to with DIF, attenuation of the medium, subsequently referred to with MA, deflection, subsequently referred to with DEF, and pressure amplification, subsequently referred to with PAMP.

PA=DIF+MA+DEF−PAMP

To the extent that liquids are selected as medium to be measured, the values for deflection and pressure amplification are negligible compared with diffraction and medium attenuation. This follows from the incompressibility of liquids. Thus, there results for the process attenuation of liquids:

PA=DIF+MA

The attenuation of the medium, especially gas attenuation, is, in the case of some media, negligibly small compared with the other influencing factors. This holds especially for air, nitrogen, oxygen, hydrogen and attenuation in water in the case of limited path lengths, preferably up to 500 mm. Thus, there results for the process attenuation of air:

PA=DIF+DEF-PAMP

The diffraction DIF describes the lessening of signal strength with increasing length of the signal path 6 due to spreading of the sound. It is known that ultrasonic signals propagate as waves with a lobe shaped profile, respectively a profile with radially increasing circular sections, into the medium. In the case of greater length of the signal path 6, thus, the amplitude of the ultrasonic waves becomes smaller and, thus, the signal strength falls.

The recognition of this structurally related decrease in signal strength is taken into consideration in the term for the diffraction DIF by the following equation:

DIF=$a\,L_0$-$b$

This linear equation means that diffraction is proportional to the path length in the medium. The constant a can lie preferably between 0.1 and 0.01, especially preferably between 0.04 and 0.08. The constant b amounts preferably to between 2-10, preferably between 5-8, wherein [a]=dB/mm, [b]=dB The attenuation of the medium MA can play an important role in ascertaining the process attenuation. This holds both for sound attenuation in liquids and in gases. The attenuation of the medium concerns sound attenuation in the medium to be measured.

In the case of some gases, especially in the case of methane, there is a linear relationship between the attenuation of the medium, more exactly stated, the gas attenuation, and the path length, according to the general formula MA=$d\,L_0$+$e$, wherein e in the case of a methane measurement is preferably zero and d preferably lies between 0.1 and 0.3, wherein the coefficients have the units [d]=dB/mm and [e]=dB, wherein, preferably, e=0.

In the case of gas compositions with saturated steam, preferably in the case of biogas, the coefficient d of the gas attenuation obeys a quadratic function of the temperature of the medium $T_{medium}$ in ° C. according to the following formula:

d=($f\,T^2$-$g\,T$+$h$)/100

In the case of measuring biogas, the constant f amounts preferably to a value between 0.0005 and 0.0015; the constant g preferably has a value between 0.05 and 0.3 and the constant h a value between 10 and 20, wherein [f]=dB/(mm*$K^2$), [g]=dB/(mm*K) and [h]=dB/mm.

A further value, which has a process-related influence on the signal strength, is the deflection DEF. The signal path 6 shown in FIG. 1 is only a representation of the path of an ultrasonic signal in the case of slower flow velocity. In the case of higher flow velocities, increasingly dispersions of the ultrasonic signal occur, so that the signal with full signal strength in the case of the earlier described, first ultrasonic signal, which was transmitted inclined and in the flow direction A, strikes more behind the actual measuring ultrasonic transducer 4 and, thus, only the signal strength of an edge region of the signal is received by the ultrasonic transducer 4. The same holds for the second ultrasonic signal, wherein this strikes more before the corresponding measuring ultrasonic transducer 3. In order to account for this dispersion effect in the case of increasing flow velocity, a corresponding attenuation is considered, taking into consideration the deflection angle DEFA in °. DEFA is calculated according to the following formula:

$$DEFA = \alpha - \arctan\frac{c\sin(\alpha) - v}{c\cos(\alpha)}$$

In such case, the angle $\alpha$ is the sensor angle in degree and amounts to preferably up to 50°, especially preferably between 15-45°, especially preferably between 20-30°, especially 25°. The flow velocity v of the medium and the velocity of sound c in the medium, in each case, in m/s, are ascertained in conjunction with the ultrasonic measuring. The deflection DEF, the corresponding attenuation, is calculated according to the following formula:

DEF=$iL_0$DEFA$^2$-($jL_0$-$k$)DEFA

In such case, the constant i is preferably assigned a value between 0.001 and 0.006. The constant j has preferably a value between 0.0005 and 0.0015. The constant k has a preferred value between 0.1 and 1, wherein [i]=dB/mm per degree$^2$, [j]=dB/mm per degree and [k]=dB per degree In the case of increase of the pressure p of the medium above the standard pressure, a signal amplification occurs. This amplification is referred to in the present application as pressure amplification and is calculated according to the following formula:

PAMP=$mp^3$-$np^2$+$Op$, wherein
[m]=dB/bar$^3$
[n]=dB/bar$^2$
[O]=dB/bar

In such case, the value of the coefficient m lies preferably between 0.01 and 0.03. The value of the coefficient n lies preferably between 0.2 and 0.8 and the value of the coefficient O lies preferably between 2 and 8.

As one can appreciate based on the formulas for the factors DIF, MA, DEF and PAMP, the process attenuation thus depends on different parameters.

The path length $L_0$ and the sensor angle $\alpha$ are, in such case, parameters that are determined by the measuring arrangement. They depend especially on the dimensions of the measuring tube and on the arrangement of the ultrasonic transducers in the measuring tube.

The pressure p and/or the temperature of the medium to be measured in the measuring tube can be ascertained by measuring sensors arranged directly in the measuring tube of the ultrasonic, flow measuring device, such as shown, for example, in FIG. 1. In such case, the temperature sensor 35 is integrated into the housing of the ultrasonic sensor 3, whereby a constructively compact sensor arrangement is achieved. This is advantageous, since the temperature or the pressure of the medium to be measured changes only slightly within the short distance in the measuring tube between the T-measuring or p-measuring and the ultrasonic measuring. Alternatively or supplementary, measuring outside of the measuring tube can also occur and the ascertained information transmitted preferably via an interface into a data evaluation unit of the ultrasonic, flow measuring device. Alternatively or supplementary, the input can also occur manually in the case of known pressure and/or known temperature.

The velocity of sound c and/or the flow velocity v are variable parameters, which are determinable based on the ultrasonic, flow measurement, preferably according to the travel-time difference method.

To the extent that a number of different ultrasonic, transducer types, respectively structural types, are applied in the ultrasonic, flow measuring device, other parameters, especially frequency of the emitted ultrasonic signals and the directional characteristic of the transducer can be taken into consideration and enter as additional terms of the signal amplification, or lessening, into the process attenuation PA in the simulating of the desired value of the signal strength $SS_{simulation}$.

Following the calculating of the desired value of the signal strength, there occurs in step e) a comparing of the simulated desired value of signal strength with a measured real value of the signal strength $SS_{meas}$.

While the measuring of the flow velocity of liquids occurs preferably in the range above 0.5 MHz, the measuring of gases is performed preferably below 0.5 MHz, especially preferably less than 0.35 kHz, especially below 250 kHz.

The process attenuation PA, which is preferably preset in the plant and which is composed of individual terms, can advantageously have an offset parameter. The offset parameter can be set either already in the factory or first at the plant of the customer, before start-up, however, after installation of the ultrasonic, flow measuring device at its intended place in the plant. In the first case, only manufacturing tolerances are compensated, while, in the second case, supplementary the concrete process conditions are corrected shortly after start-up. The has the advantage that the factory setup information of the device can be adapted to the particular conditions of the plant by a knowledgeable engineer after installation of the ultrasonic, flow measuring device in the plant and/or in order, in given cases, to match manufacturing tolerances, which occurred in the production of the ultrasonic, flow measuring device, to the specifications of the constants in the method.

The method of the invention can be performed preferably continuously during measurement operation of the device simultaneously with determining the flow velocity and/or the material composition of the medium. In this way, a continuous self-diagnosis of the state of the ultrasonic transducer can be provided.

Alternatively, it is, however, also possible to perform the method only when required, so that this extra demand on the computing power of the measuring device occurs only from time to time.

The method of the invention provides detection of age related or fouling related operating states in ultrasonic transducers, so that appropriate countermeasures can be undertaken, in contrast, before experiencing major measurement errors or complete failure of the ultrasonic transducer.

Thus, for example, necessary replacement devices can be timely ordered and long downtimes of plants prevented. Preferably, also necessary cleaning of the ultrasonic transducer can occur during operation or a self-cleaning of the plant can be initiated using the CIP method.

It is further advantageous, when the method ascertains at a point in time $t_1$ an actual value of a deviation $\delta(SS)_{actual}$ between the desired value of the simulated signal strength $SS_{simulation}$ and the actually measured signal strength $SS_{meas}$ and stores such, so that the time development of a plurality of values of this deviation is graphically displayable. Ideally, the value of this deviation $\delta(SS)_{actual}$ should be as constant as possible. If there is a lasting decline of this value of the deviation $\delta(SS)_{actual}$ from a value of a starting deviation $\delta(SS)_{start}$, respectively a starting value $\delta(SS)_{start}$, for the deviation of a simulated desired value of a signal strength $SS_{simulation}$ for the point in time $t_{start}$ from an ascertained real value of the signal strength $SS_{meas}$, the ultrasonic, flow measuring device can display this to the user using an output signal.

In order to obtain reliable information concerning a possible measurement stoppage, it is advantageous, when the value $\delta(SS)_{actual}$ different from the starting deviation $\delta(SS)_{start}$ deviates by at least 3 dB, preferably at least 5 dB, especially preferably between 9-11 dB, especially 10 dB, from the starting deviation $\delta(SS)_{start}$, which preferably was recorded at start-up.

It is additionally conceivable that the value changes for only a short time, due to temporary contaminations on the ultrasonic transducer. Therefore, the value $\delta(SS)_{actual}$ different from the starting deviation $\delta(SS)_{start}$ should preferably deviate for at least more than 3 h, preferably for more than a day, from the starting deviation $\delta(SS)_{start}$.

Based on the time tracking of the actual value for the point in time $t_1$ of the deviation $\delta(SS)_{actual}$ and its comparison with the value of the starting deviation $\delta(SS)_{start}$ or with some other earlier actual value, it can be ascertained by extrapolation, at which point in time a failure or a faulty measurement of the ultrasonic, flow measuring device is probable.

A method for monitoring the operating state of a first ultrasonic transducer in an ultrasonic, flow measuring device having at least one measuring tube and at least two ultrasonic transducers in the case of flow measurement of biogas is preferably characterized by the steps as follows:

a) providing a first term taking into consideration the path length of an ultrasonic signal through the biogas located in the measuring tube;

b) providing a second term taking into consideration the path length and a temperature of the medium at the point in time $t_1$.

c) providing a third term taking into consideration the sensor angle of the first ultrasonic transducer in the measuring tube, the flow velocity of the biogas in the measuring tube, the velocity of sound in the biogas and the path length;

d) providing a fourth term taking into consideration the pressure of the biogas, and e) combining the first, second, third and fourth terms for simulating a desired value of a signal strength; and f) comparing the simulated desired value of signal strength with an ascertained, real value of signal strength.

REFERENCE CHARACTERS 1 ultrasonic, flow measuring device
2 measuring tube
3 first ultrasonic transducer
4 second ultrasonic transducer
6 signal path
35 temperature sensor
α sensor angle
A flow direction
v flow velocity of a medium to be measured
T temperature of a medium to be measured
p pressure of a medium to be measured
c velocity of sound in the medium
$L_0$ path length $SS_{simulation}$ desired value of a simulated signal strength
$SS_{meas}$ measured value of a signal strength
$\delta(SS)_{start}$ starting value for a deviation between simulated and measured signal strength at the point in time $t_{start}$
$\delta(SS)_{actual}$ actual value for a deviation between simulated and measured signal strength for the point in time t

The invention claimed is:

1. A method for monitoring the operating state of a first ultrasonic transducer in an ultrasonic, flow measuring device having at least one measuring tube and at least two ultrasonic transducers, comprising the steps of:
   a) providing a first value or a plurality of first values, which relate to the geometric arrangement of the first ultrasonic transducer in the measuring tube and/or to the geometric arrangement of the first ultrasonic transducer relative to a second ultrasonic transducer,
   b) ascertaining a second value or a plurality of second values for a flow velocity of a medium located in the measuring tube;
   c) providing a third value and/or a plurality of third values for temperature and/or pressure of the medium located in the measuring tube;
   d) simulating a desired value of a signal strength or of a signal-to-noise ratio taking into consideration the first, second, and/or third values; and
   e) comparing the simulated desired value of the signal strength or of the signal-to-noise ratio with an ascertained real value of the signal strength or of the signal-to-noise ratio.

2. The method as claimed in claim 1, wherein:
said simulating of the desired value of the signal strength or of the signal-to-noise ratio occurs based on at least two different values of the first, second and/or third values.

3. The method as claimed in one of claim 1, wherein:
the path length of an ultrasonic signal through the medium located in the measuring tube is provided as said first value.

4. The method as claimed in claim 2, wherein:
a sensor angle of the first ultrasonic transducer in the measuring tube is provided as first value.

5. The method as claimed in claim 1, further comprising the step of:
   ascertaining a fourth value or a plurality of fourth values for velocity of sound in a medium located in the measuring tube, wherein:
   said fourth value is included in the simulating of a desired value of a signal strength or a desired value of a signal-to-noise ratio.

6. The method as claimed in claim 1, further comprising the step of:

ascertaining an actual value for the deviation at a point in time $t_1$ by comparing the simulated desired value of a signal strength with an ascertained real value of the signal strength.

7. The method as claimed in claim 6, wherein:

a starting value for the deviation of a simulated desired value of a signal strength at the point in time $t_{start}$ from an ascertained real value of the signal strength is ascertained; and the actual value for the deviation of the simulated desired value of the signal strength at the later point in time $t_1$ from the ascertained real value of the signal strength at the later point in time $t_1$ is ascertained, wherein an indication of the operating state of the first ultrasonic transducer occurs, to the extent that the actual value deviates by at least 3 dB, preferably at least 5 dB, especially preferably between 9-11 dB, especially 10 dB, from the starting value.

8. The method as claimed in claim 6, wherein:

a starting value for the deviation of a simulated desired value of a signal strength at the point in time $t_{start}$ from an ascertained real value of the signal strength is ascertained, and two or more actual values of the deviations of simulated desired values of the signal strength at later points in time $t_1, t_2, \ldots t_n$ from the ascertained real value of the signal strength at the later points in time $t_1, t_2, \ldots t_n$ are ascertained; and based on the time rate of change of the actual values a prediction is made concerning the probability of failure of the ultrasonic transducer.

9. The method as claimed in claim 6, wherein:

a starting value for the deviation of a simulated desired value of a signal strength at the point in time $t_{start}$ from an ascertained real value of the signal strength is ascertained, and the actual value of the deviation of the simulated desired value of the signal strength at the later point in time $t_1$ from the ascertained real value of the signal strength at the later point in time $t_1$ is ascertained; and an indication of an operating state of the first ultrasonic transducer occurs, to the extent that the actual value at more than 1 h, preferably more than 24 h, especially preferably more than 48 h deviates by at least 3 dB, preferably at least 5 dB, especially preferably between 9-11 dB, especially 10 dB, from the starting value.

* * * * *